United States Patent [19]
Hsu

[11] Patent Number: 6,057,622
[45] Date of Patent: May 2, 2000

[54] DIRECT CONTROL OF AIR GAP FLUX IN PERMANENT MAGNET MACHINES

[75] Inventor: John S. Hsu, Oak Ridge, Tenn.

[73] Assignee: Lockheed Martin Energy Research Corporation, Oak Ridge, Tenn.

[21] Appl. No.: 09/234,919

[22] Filed: Jan. 21, 1999

[51] Int. Cl.[7] .................................................. H02K 1/00
[52] U.S. Cl. .................... 310/191; 310/155; 310/168; 310/257; 310/268; 310/214; 310/156; 310/261; 310/180; 310/179
[58] Field of Search .................................. 310/191, 155, 310/168, 257, 268, 214, 156, 261, 180, 179

[56] References Cited

U.S. PATENT DOCUMENTS

| | | | |
|---|---|---|---|
| 3,613,532 | 10/1971 | Wildhaber | 396/549 |
| 3,702,965 | 11/1972 | Drexler et al. | 322/25 |
| 3,761,847 | 9/1973 | Strubin | 335/1 |
| 4,338,557 | 7/1982 | Wanlass | 318/729 |
| 4,639,626 | 1/1987 | McGee | 310/155 |
| 4,654,551 | 3/1987 | Farr | 310/112 |
| 5,808,392 | 9/1998 | Sakai et al. | 310/214 |
| 5,818,139 | 10/1998 | Yamagiwa et al. | 310/156 |
| 5,825,113 | 10/1998 | Lipo et al. | 310/181 |

OTHER PUBLICATIONS

S. Morimoto, Y. Takeda, T. Hirasa, and K. Taniguchi, "Expansion of Operating Limits for Permanent Magnet by Current Vector Control Considering Inverter Capacity," IEEE Transactions on Industry Applications, vol. 26, No. 5, Sep./Oct. 1990, pp. 866–871.

W.L. Soong and T.J.E. Miller, "Field–Weakening Performance of Brushless Synchronous AC Motor Drives," pp. 331–340, IEEE Proc.–Electr. Power Appl., vol. 141, No. 6, Nov. 1994.

Chandra S. Namuduri, Bslarama V. Murty, "High Power Density Electric Drive for an Hybrid Electric Vehicle," Conference Proceedings, APEC'98, vol. 1, pp. 34–40, 98CH36154, Feb. 15–19, 1998, The Disneyland Hotel, Anaheim, California.

Y. Sozer, D.A. Torrey, "Adaptive Flux Weakening Control of Permanent Magnet Synchronous Motors," pp. 475–482, Conference Record, 1998 IEEE Industry Applications Conference, vol. 1, Oct. 12–15, 1998, St. Louis, Missouri.

T. Sebastian, G.R. Slemon, "Operating Limits of Inverter–Driven Permanent Magnet Motor Drives," pp. 800–805, CH2272–3/86, IEEE.

*Primary Examiner*—Nestor Ramirez
*Assistant Examiner*—Thanh Lam
*Attorney, Agent, or Firm*—Quarles & Brady LLP

[57] ABSTRACT

A method and apparatus for field weakening in PM machines uses field weakening coils (35, 44, 45, 71, 72) to produce flux in one or more stators (34, 49, 63, 64), including a flux which counters flux normally produced in air gaps between the stator(s) (34, 49, 63, 64) and the rotor (20, 21, 41, 61) which carries the PM poles. Several modes of operation are introduced depending on the magnitude and polarity of current in the field weakening coils (35, 44, 45, 71, 72). The invention is particularly useful for, but not limited to, the electric vehicle drives and PM generators.

16 Claims, 5 Drawing Sheets

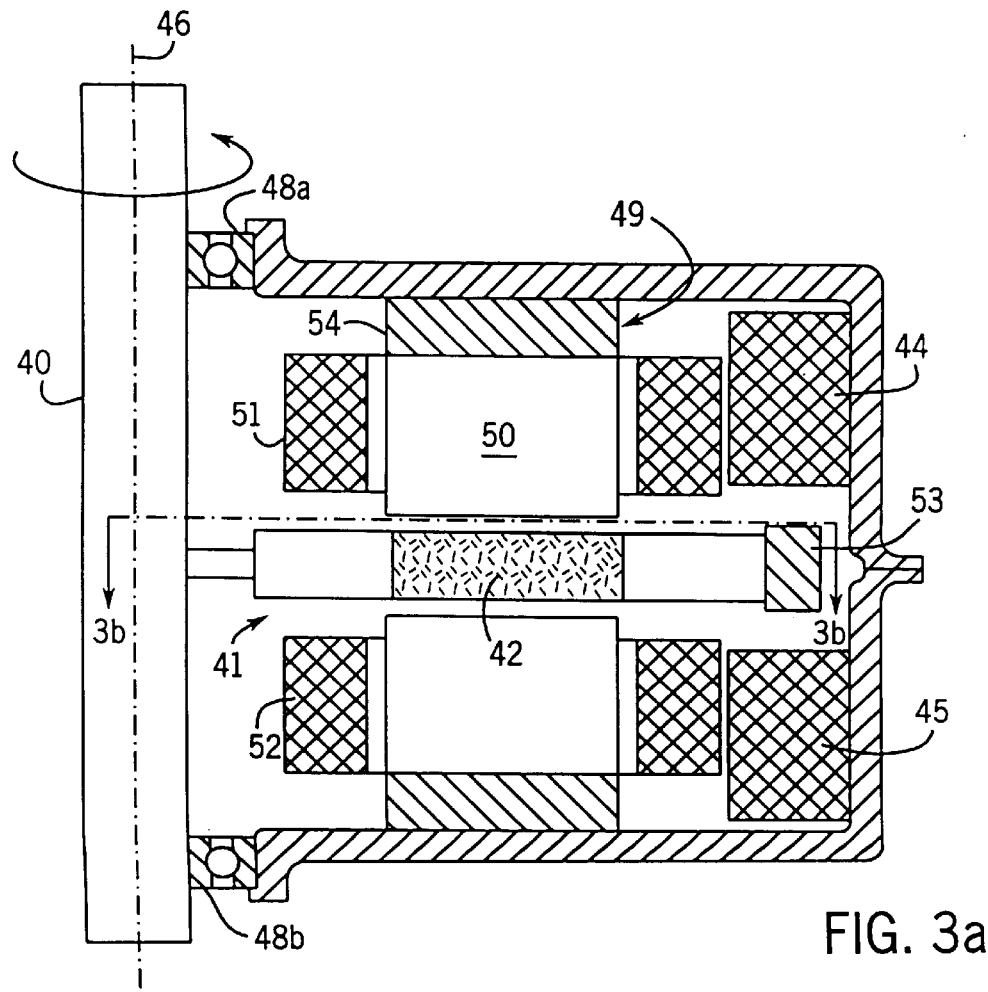
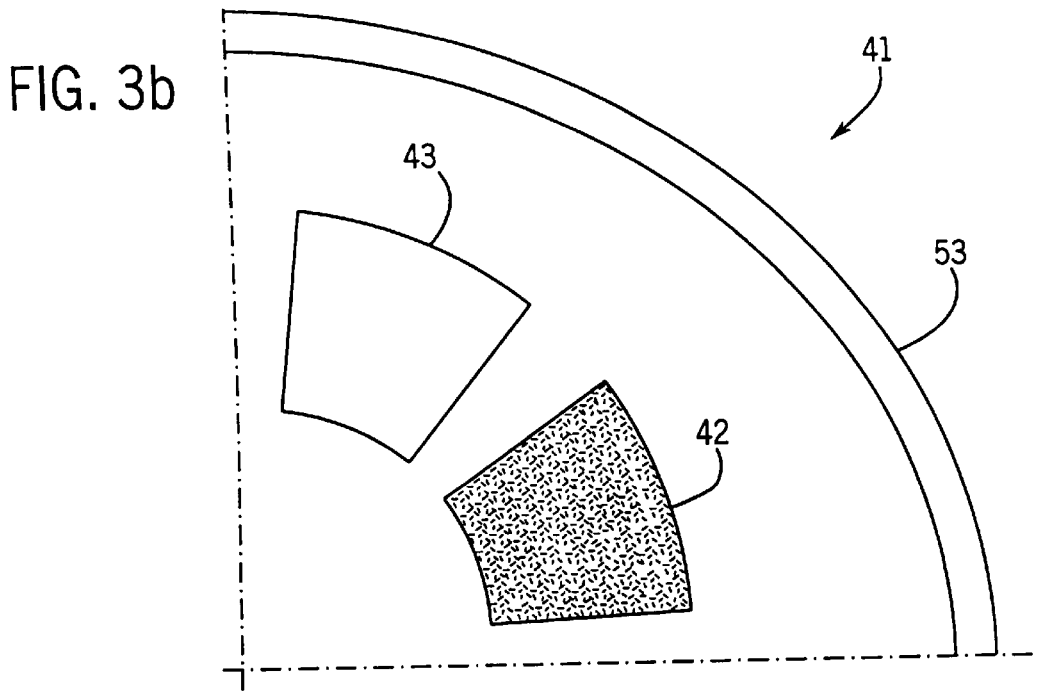
FIG. 3a
FIG. 3b

DIRECT CONTROL OF AIR GAP FLUX IN PERMANENT MAGNET MACHINES

STATEMENT REGARDING FEDERALLY SPONSORED RESEARCH

This invention was made with Government support under Contract No. DE-AC05-96OR22464 awarded by the U.S. Department of Energy. The Government has certain rights in the invention.

DESCRIPTION OF THE BACKGROUND ART

In electrical machines, permanent magnets (PM) are a well-known alternative to field windings for producing flux in an air gap between the armature and the field. PM machines are known for having a higher power density than other electric machines. However, field weakening or field adjustment is not easily accomplished in PM machines, because connections to field windings are unavailable in basic PM machines. As used herein, the generalized term "machines" shall mean and include both motors and generators. The term "PM electric machines" includes AC induction machines, DC machines and synchronous machines.

Field weakening is necessary for operation of the above-mentioned machines in the constant horsepower range, which commences at a speed known as "base speed." Below this speed, torque and speed are increased with armature voltage. At rated horsepower, armature voltage and speed cannot be increased without other adjustments. Instead, the field must be weakened to allow the above-mentioned machines to increase speed while sacrificing torque.

For PM generators, field weakening is used to control the generator output voltage at speeds above base speed. Otherwise, it is an option to use a buck-boost converter to control the DC link voltage of the inverter or converter. The technology for directly controlling the PM generator terminal voltage and the PM motor back electromotive force (emf) has not been available.

Various relatively complex approaches exist for obtaining field weakening of PM machines. One approach assumes that direct control of the magnetic flux is not available, and that field weakening should be accomplished by controlling the direct-axis armature current to weaken the air gap flux. In this approach, demagnetization of the permanent magnets can be a problem, due to the reaction of the armature to the direct axis current component.

Another approach has suggested an optimal high-saliency interior PM motor design for machines requiring a wide field weakening range.

Phase angle control has also been suggested for field weakening in PM machines. Although torque at no-load speed can be increased significantly by advancing the phase angle of operation, this results in increased power losses in the machine.

Another approach uses adaptive control of a surface mount PM motor over its entire speed range. In the adaptive flux-weakening method, the direct-axis current can be controlled for a variety of operating conditions.

Still another approach has suggested that with optimum alignment of the stator and permanent magnet fields, maximum torque per ampere is achieved up to base speed. Operation at higher speeds with reduced torque is achieved by adjustment of the current angle to reduce the effective magnetic flux, i.e., the equivalent of field weakening.

SUMMARY OF THE INVENTION

In the method and apparatus of the present invention, the air gap flux of a PM machine is directly controlled by controlling the magnitude and polarity of a direct current (DC) fed to a field weakening control coil.

In a specific embodiment of the invention a piece of ferromagnetic material is assembled with the stator to provide a path for communicating flux to the stator. At least one coil is positioned to induce a field control flux in the piece of ferromagnetic material to adjust the magnitude and polarity of the air gap flux to further reduce back electromotive force and allow operation of the machine above base speed in the field weakening range of operation.

With the invention there is no special requirement for an inverter to control the direct-axis and quadrature-axis current components. In addition, a position sensor is not necessary for inverter control. In a normal range, the field weakening control coil does not cause demagnetization of the permanent magnets.

With the invention, a 10:1 field weakening ratio can be obtained.

The new method is robust and particularly useful for, but is not limited to, electric vehicle drives and PM generators. The same principle can be used for either axial or radial gap PM machines.

Other objects and advantages of the invention, besides those discussed above, will be apparent to those of ordinary skill in the art from the description of the preferred embodiment which follows. In the description, reference is made to the accompanying drawings, which form a part hereof, and which illustrate examples of the invention. Such examples, however, are not exhaustive of the various embodiments of the invention, and therefore, reference is made to the claims which follow the description for determining the scope of the invention.

BRIEF DESCRIPTION OF THE DRAWINGS

FIG. 3a is a longitudinal half section schematic view of a PM machine of the present invention;

FIG. 3b is a quarter section view taken in the plane indicated by line 3b—3b in FIG. 3a;

FIG. 4b is a detail sectional view taken in the plane indicated by line 4b—4b in FIG. 4a.

DETAILED DESCRIPTION OF THE PREFERRED EMBODIMENTS

The principle of equalization of air gap flux densities for field weakening of a new type of PM machines can be explained through the air gap fluxes acting on the coil edges as shown in FIGS. 1a–1e.

Figure 1A:
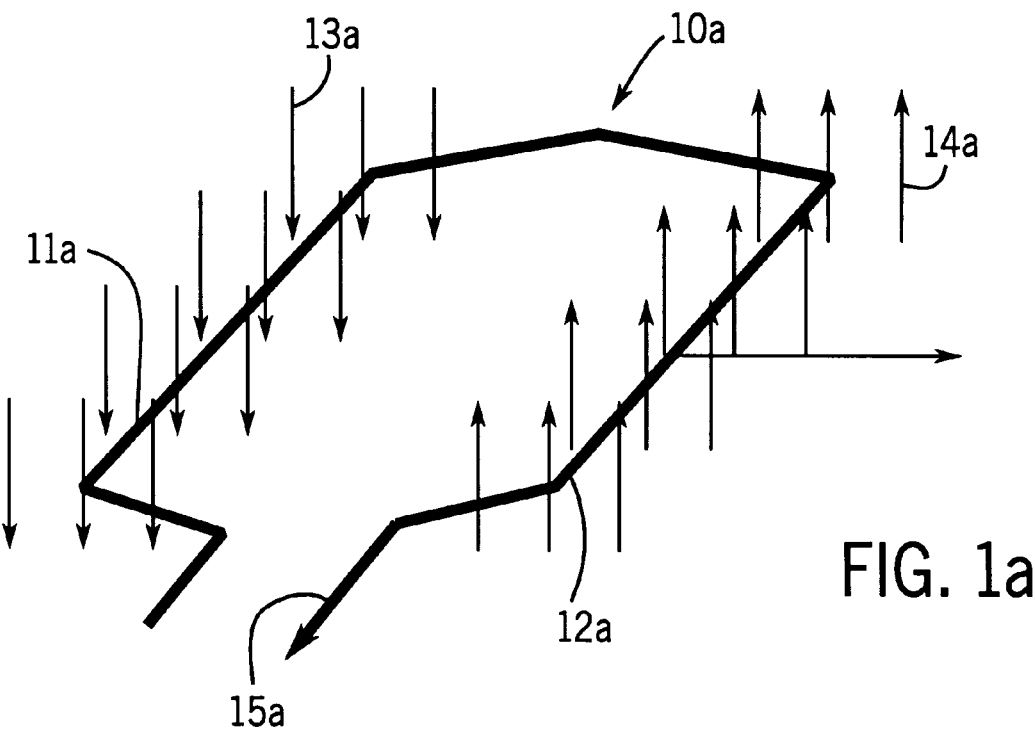
FIGS. 1a–1e are schematic diagrams illustrating modes of operation according to the present invention.
Figure 1B:
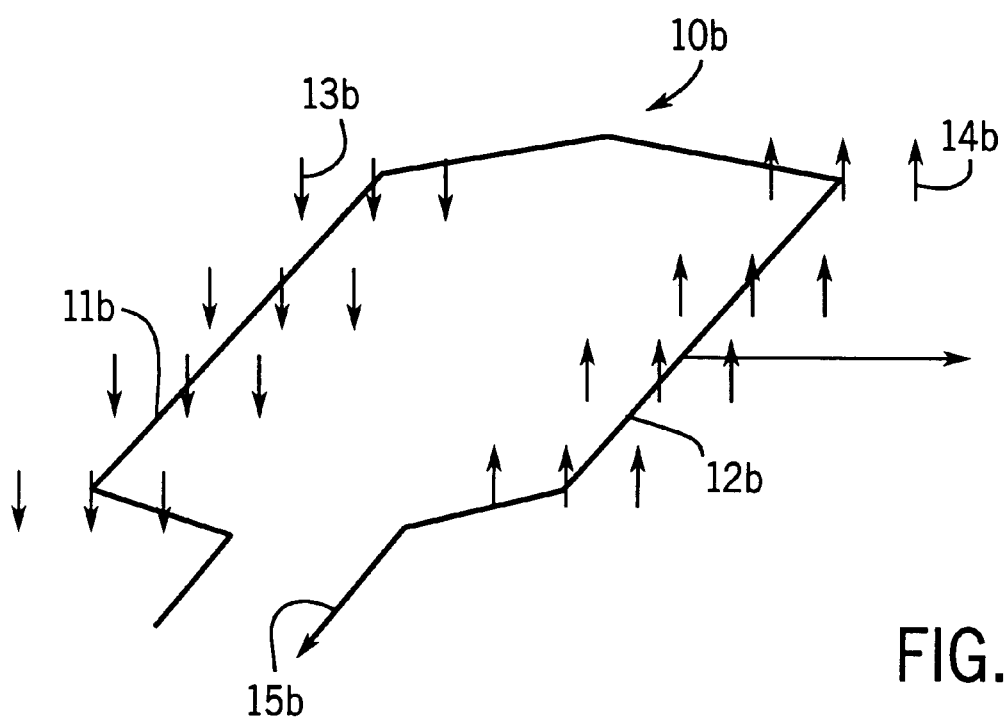

FIG. 1a shows the normal situation of a coil 10a in a PM machine where the air gap fluxes 13a, 14a of opposite polarities are acting on two opposite coil edges 11a and 12a. A back electromotive force (back emf) 15a is induced when there is a relative movement between the coil 10a and the air gap fluxes 13a, 14a. FIG. 1b shows that for a conventional PM machine field weakening, the direct-axis current component weakens the field. The magnitudes of the air gap fluxes 13b, 14b at both coil edges 11b, 12b are weakened equally in magnitude in comparison with FIG. 1a, but opposite polarities are maintained. Consequently, a smaller back emf 15b is induced.

Figure 1C:
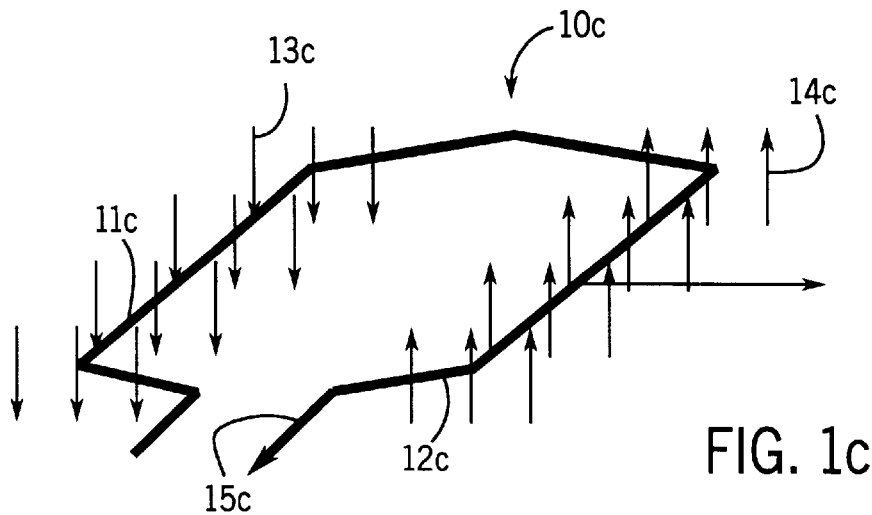
Figure 1D:
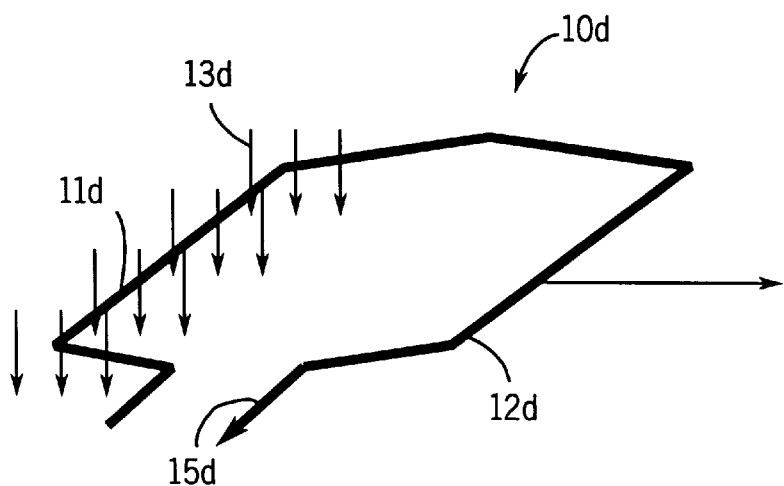
Figure 1E:
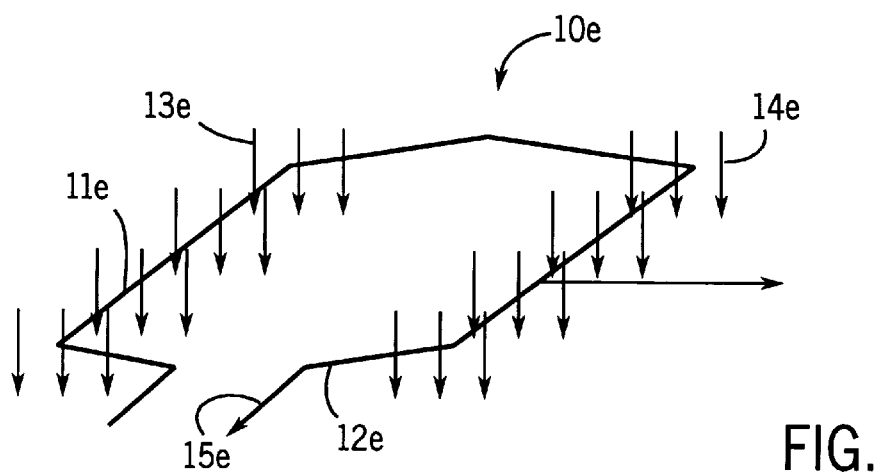

FIGS. 1c–1e illustrate that a back emf which is small or close to zero can be generated even when the magnitudes of the air gap fluxes remain high. In this example, the polarities of the air gap fluxes play an important role for weakening the back emf. FIG. 1c shows a normal situation for air gap fluxes 13c, 14c, in PM motors which is the same as that explained for FIG. 1a. As shown in FIG. 1d, however, if the flux acting on a coil edge 12d is taken away, the back emf 15d is reduced, because the magnitude of the sum of the flux densities 13d, 14d acting on the two coil edges 11d, 12d is smaller than that of the normal situation. The back emf can be very small as shown in FIG. 1e when the air gap fluxes 13e, 14e acting on the two coil edges 11e, 12e are nearly equal in magnitude with the same polarity.

The wave form of the back emf of a coil edge is a direct reflection of the air gap flux distribution of a pole that the coil edge is under. Both the short pitch approach and the distribution approach for harmonic cancellations can be used.

Figure 2A:
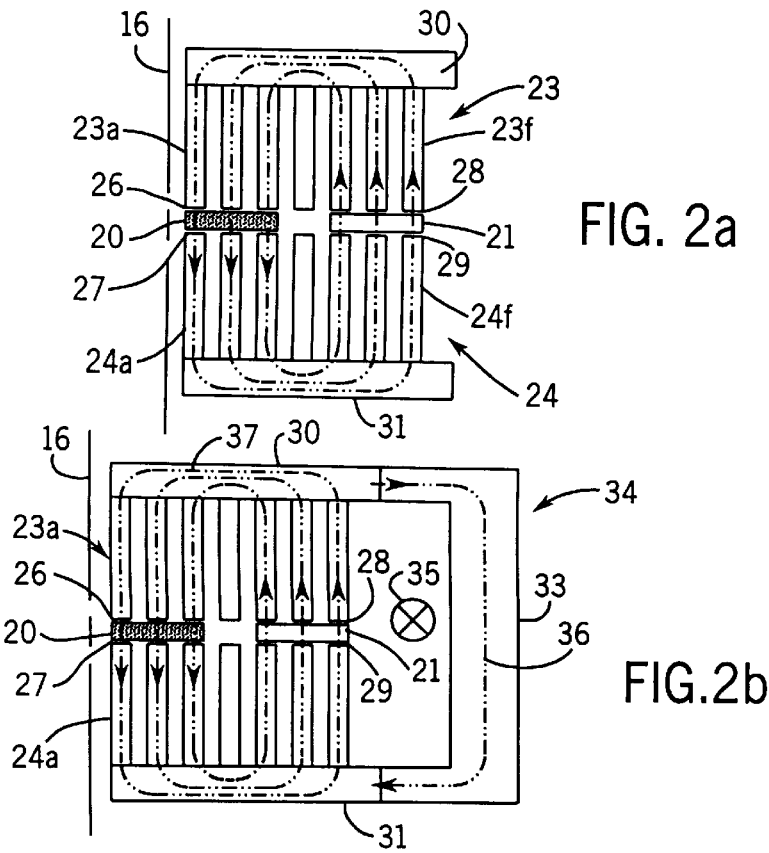
FIGS. 2a–2d are schematic diagrams of apparatus according to the invention for carrying out the operating modes of FIGS. 1a–1e.

FIGS. 2a–2d show an axial-gap PM machine of the present invention. A first rotor pole 20 and a second rotor pole 21 are situated in a rotor operating space between two stators 23, 24, having a plurality of teeth 23a–23f and 24a–24f as shown in FIG. 2a. The first rotor pole 20 is made of permanent magnetic material, and the second rotor pole 21 is made of ferromagnetic material. As seen in FIGS. 2a–2d, these poles are positioned on one side of a rotor shaft 16 of non-magnetic material represented schematically by an axis line. The magnetic path is traced as follows. Flux travels from the second rotor pole 21 in a counterclockwise direction. The flux goes through the air gap portion 28, the stator armature teeth 23d–23f, the stator back iron 30, the stator teeth 23a–23c facing PM rotor pole 20, the air gap portion 26, the PM rotor pole 20, the air gap portion 27, the lower stator teeth 24a–24c, the lower stator back iron 31, the lower stator teeth 24d–24f, and the air gap portion 29. Finally, the flux returns to rotor pole 21. The PM rotor pole 20 must have sufficient thickness in order to push the desired flux through both sets of air gap portions 28, 29 and 26, 27 facing the poles 20, 21. This arrangement is also the equivalent of a conventional PM machine that has both poles made of PM, but with half the thickness of the PM of pole 20.

Figure 2B:
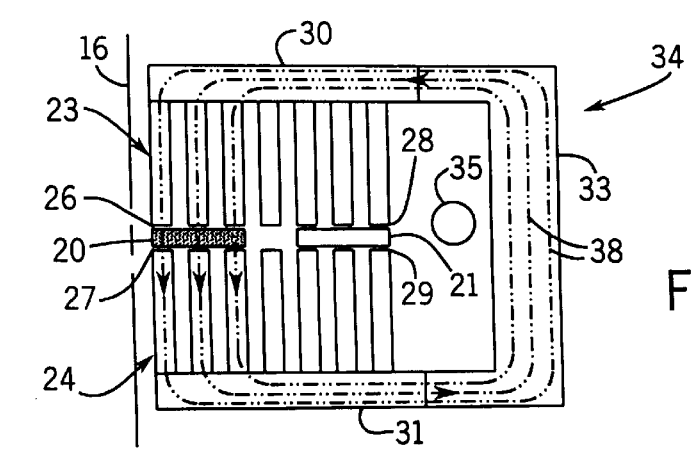

FIG. 2b shows that other portions 33 of the frame 34 which contact the back irons 31, 32 of the stators 23, 24 provide a third magnetic path in parallel with the paths described above. A control coil 35 encircles these portions 33, and a DC control current is supplied in the direction into the plane of the diagram in FIG. 2b. This provides a magnetopotential 36 in the clockwise direction shown, which counters the flux 37 traveling in an opposite, direction through stator back irons 30, 31.

Because a net primary flux still flows through the permanent rotor poles 20 and 21, the additional magnetopotential would not demagnetize the PM pole 20. This is similar to the mode of operation previously described for FIG. 1c where the highest back emf would be produced. For an electric vehicle drive, this situation is most suitable for operation at low speed and high torque.

Figure 2C:
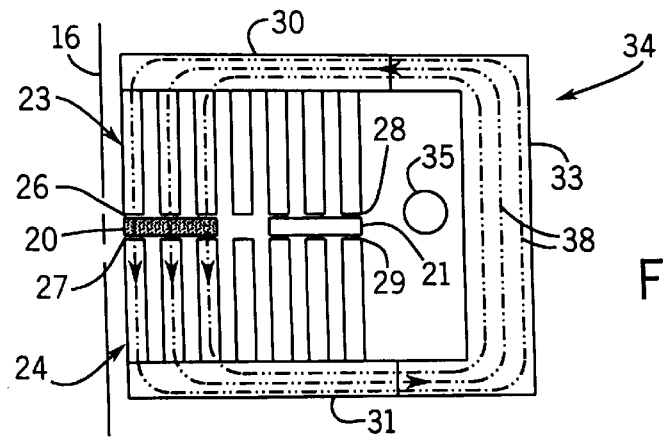

In FIG. 2c the field weakening control coil 35 has no current, and in this case, the PM flux 38 goes completely through the stator frame 34. Little or no flux (a negligible amount) is present in the high reluctance path through the non-magnetized rotor pole 21. The air gap fluxes are similar to that shown in FIG. 1d. This mode of operation is most suitable for an electric vehicle running at medium speed with a medium torque requirement.

Figure 2D:
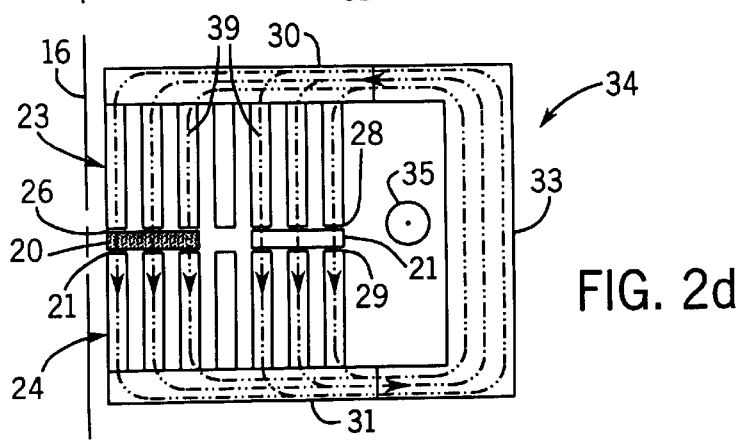

In FIG. 2d the field weakening control coil 35 is fed with a DC control current with an opposite polarity from FIG. 2b. This produces air gap fluxes 39 of equal magnitude and the same polarity at both the first rotor pole 20 and rotor pole 21. Though the air gap fluxes remain strong, the field back emf is weakened to nearly zero. This corresponds to the situation shown in FIG. 1e. It should be noted that under no situation is the PM pole 20 subjected to demagnetization due to this field weakening. The methodology described in relation to FIGS. 1c–1e and FIGS. 2b–2d can be applied to many different machine structures. The following are but examples of specific machine structures for carrying out this form of field weakening and flux control in PM machines.

FIG. 3a shows one half-section of a possible new PM machine structure. The illustration is shown in relation to a rotating shaft 40 for the rotor 41. The other half section would be a mirror image of FIG. 3a. As seen in FIG. 3b, the rotor 41, which provides the field, has pole pieces 42 of PM material alternated with pole pieces 43 of non-magnetized ferromagnetic material. FIG. 3b shows a quarter section of the rotor 41, and the full rotor 41 would have eight poles.

The rotor pole pieces 42, 43 (FIG. 3b) are mounted in holes in a non-magnetic rotor body 62 that is mounted on the shaft 40 for rotation therewith. A band 53 may be used on the outer periphery of the rotor 41 to increase the rotor strength for high-speed operations. Referring again to FIG. 3a, two field weakening control coils 44, 45 are toroidal in form and are mounted on a machine frame 47. These coils 44, 45 encircle the shaft 40 and are centered on a shaft axis 46. The machine frame 47 is made of mild steel so as to function as a flux path. The shaft 40 is mounted for rotation in the frame 47 by bearings 48a, 48b. In order to prevent shaft flux, a nonmagnetic bearing insert, a nonmagnetic shaft or non-magnetic bearings should be used. One axial gap stator 49 is seen in FIG. 3a and would be extended to the opposite side of the shaft 40. Each stator 49 has a yoke 54 which provides a flux return path similar to back irons 30, 31 in FIGS. 2a–2d. Stator 49 has a plurality of teeth 50 around its inner circumference which extend radially toward a stator axis coinciding with a section through the rotor 41. Armature coils 51, 52 are wound inside the slots between the radially directed teeth 50.

In this PM machine, the shaft 40 is driven to rotate rotor 41. This induces a voltage in the armature windings 51, 52. The field weakening coils 44, 45 are provided with a current to produce a counter flux in the stator 49 and yoke 54. This current can be of either polarity or can be reduced to zero to carry out the three modes of operation described above for FIGS. 2b–2d.

Figure 4A:
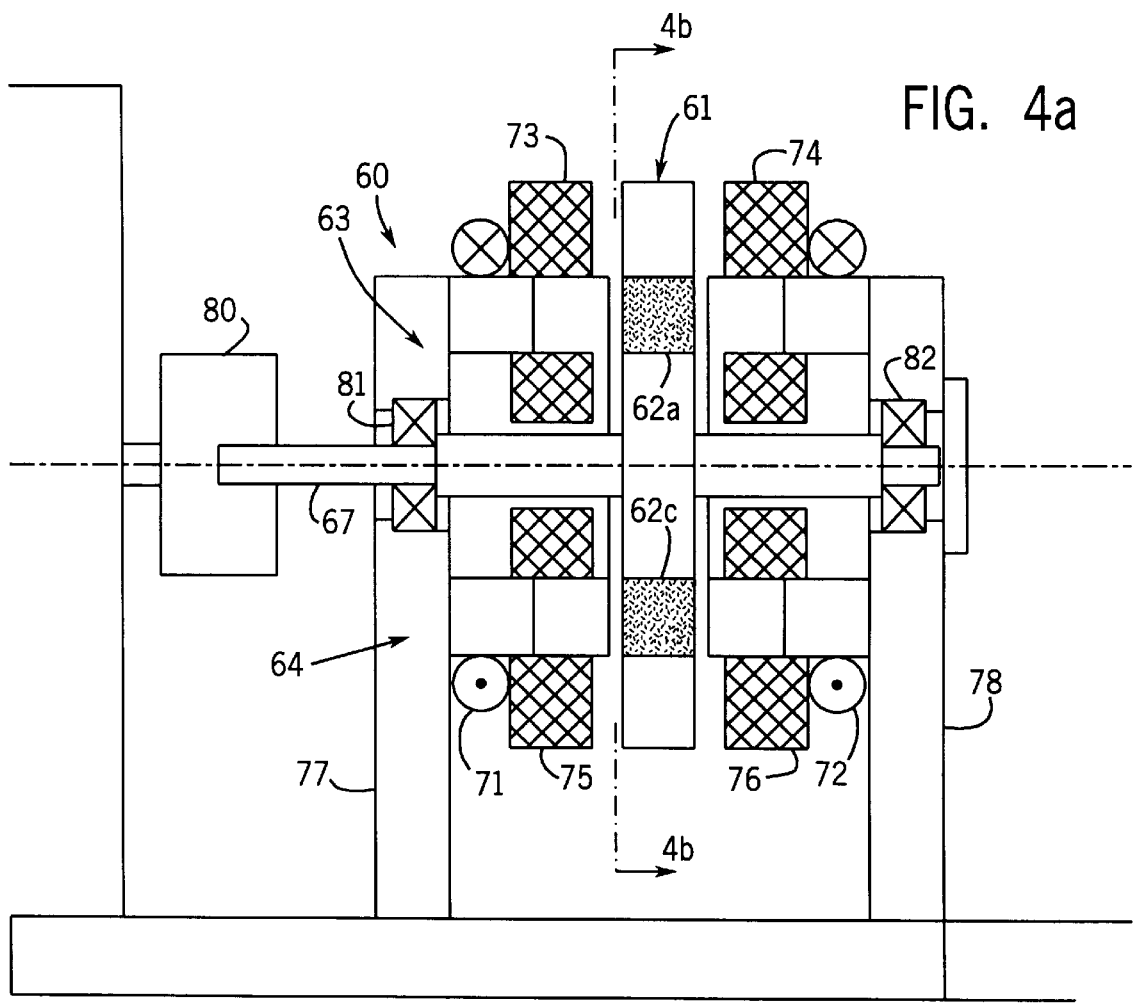
FIG. 4a is a longitudinal section schematic view of a PM machine incorporating coils for flux weakening according to present invention.

FIG. 4a is a sectional view of a 4-pole PM generator 60. The rotor 61 of this particular machine is positioned between two stators 63, 64 and is mounted on a rotating shaft 67, in an axially disposed gap relative to the rotor shaft 67, which is supported in two bearings 81, 82. The invention is also applicable to machines in which the air gap between the rotor and stator is in a radially disposed gap relative to the rotor shaft.

Figure 4B:
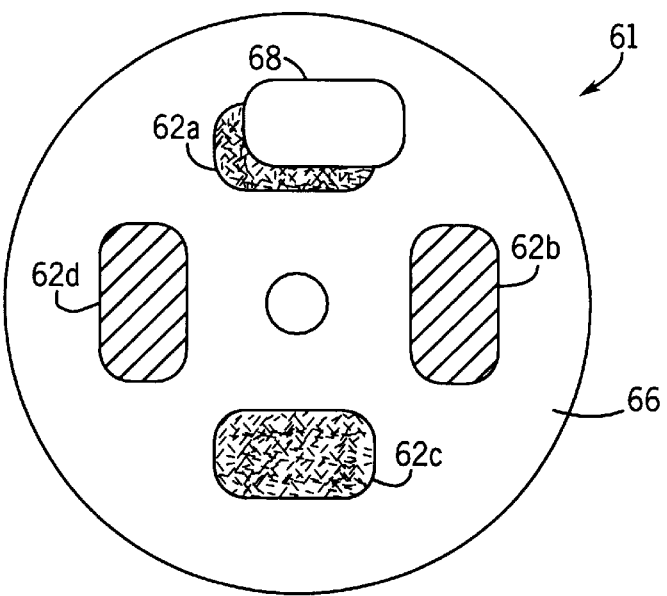

FIG. 4b shows the poles 62a–62d in its rotor 61. Two of the rotor poles are made of mild steel. The other two poles 62a, 62c are made of PM rods. These two PM poles 62a, 62c have the same polarity and a thickness sufficient for pushing the air gap fluxes through the PM poles 62a, 62c and the mild-steel poles 62b, 62d to form a complete magnetic path.

The poles are preferably oval or trapezoidal in cross-section, but in a prototype were formed by pairs of rods inserted into an aluminum rotor body 66 that is attached to a non-magnetic shaft 67 made of stainless steel. It is expected that these two round magnets per pole will cause harmonics in the back emf. However, pole caps 68, one of which is shown in FIG. 4b, can be placed on top of each pole 62a–62d to reduce the air-gap-flux harmonics.

Two control coils 71, 72 (FIG. 4a) for field weakening are wound in toroidal shape and are placed around the two stators 63, 64 between the stator windings 73–76 and the end walls 77, 78 of the steel supporting frame of the machine. The coil windings 71, 72 contain approximately 100 turns each. Like a field coil of a direct-current (DC) machine, more turns of the field weakening control coils 71, 72 require less excitation current. Normally, the field coil power is a very small percentage of the total power of a DC machine. The prototype stator has twelve slots, and the coils are of full pitch with one coil per pole per phase.

The steel support frame 77, 78 of the machine is made of ½" mild steel. It is expected that the thickness of a round steel frame would be significantly reduced, because the periphery of a frame is about three times the outer diameter of a machine.

In order to measure the back emf of the stator armature windings 73–76, the rotor of the prototype machine is driven by a small motor 80 of roughly 1200 rpm. A driving motor 80 is shown on the left-hand side of FIG. 4a. The two axial-gap stators 63, 64 were originally designed for a 50,000-rpm high-speed PM motor, and then tested using a low speed motor 80 to generate low voltages.

Back emf values were observed in relation to the control currents of the field weakening coil. As mentioned before, because the driving motor 80 runs at low speed, the back emf is expectedly low. The ratio of the emf values was observed to change from the maximum value to the minimum value. Tests have shown that a field weakening ratio of 10:1 and higher can be obtained.

Thus, the present invention provides a range of field weakening ratio from 1:1 up to at least 10:1. The field weakening control coils provide direct, rather than indirect, control of flux in the air gaps. No control of the direct and quadrature-axis current components is necessary for the new PM machines. Under a normal control range, demagnetization due to field weakening is not a problem. The same principle can be used for either axial or radial gap PM machines. The invention is particularly useful for, but is not limited to, electric vehicle motor drives and PM generators.

While the embodiments described above relate to axial gap machines, the invention is also applicable to machines in which an air gap is positioned radially in relation to an axis of rotation for the rotor. The invention is also applicable to air core machines in which the stator does not have teeth, but instead provides a uniform inner diameter, positioned radially from the rotor to define an air gap.

The above description has included several detailed embodiments, which are intended as examples of the invention. For a definition of these and other embodiments which come within the scope of the invention reference is made to the claims which follow.

What is claimed is:

1. A PM electrical machine, comprising:
    at least one stator forming a plurality of poles on opposite sides of a rotor operating space, at least two pairs of stator poles being formed, and a plurality of armature coils wound on said stator, wherein said armature coils operate with an armature voltage that is related to a flux in the stator;
    a rotor having an axis of rotation, said rotor being disposed in the rotor operating space and being separated by at least one portion of an air gap from said at least one stator, said rotor having no field windings and said rotor having a plurality of poles disposed around the axis of rotation, in which at least one of said poles contains permanent magnet material for producing air gap flux in said air gap, and another of said poles is without permanent magnet material, and wherein said rotor poles become aligned in operation with respective pairs of stator poles;
    a piece of ferromagnetic material assembled with said stator to provide a path for communicating a control flux to said stator and to said air gap through the plurality of stator poles and corresponding rotor poles; and
    at least one field weakening coil capable of receiving current from an external source, said field weakening coil being positioned to induce a field control flux in said piece of ferromagnetic material to adjust a magnitude and a polarity of the air gap flux through the plurality of rotor poles.

2. The PM electrical machine of claim 1, wherein the DC electrical machine is a generator.

3. The PM electrical machine of claim 1, wherein said air gap is positioned axially relative to the axis of rotation of the rotor.

4. The PM electrical machine of claim 3, wherein the DC electrical machine has at least two stators.

5. The PM electrical machine of claim 4, further comprising a second field weakening coil, each of said field weakening coils being disposed around portions of said two stators on one side of said air gap.

6. The PM electrical machine of claim 1, wherein the rotor has at least four poles, at least two poles being made of permanent magnet material.

7. The PM electrical machine of claim 1, wherein the field weakening ratio is in a range up to 10:1.

8. The PM electrical machine of claim 1, wherein said stator provides first and second air gaps relative to the rotor, and wherein in a first mode of operation current with a first polarity is supplied to said coil to produce an air gap flux in said second air gap in an opposite direction to an air gap flux in said first air gap to produce a net air gap flux differential.

9. The PM electrical machine of claim 8, wherein in a second mode of operation, no current is supplied to said coil to allow the piece of ferromagnetic material to produce a negligible air gap flux in one of the first and second air gaps to reduce the net air gap flux differential.

10. The PM electrical machine of claim 9, wherein in a third mode of operation, current with a second polarity opposite said first polarity is supplied to said coil to produce an air gap flux in said second air gap which is equal and in a like direction to an air gap flux in said first air gap, to further reduce the net air gap flux differential.

11. The PM electrical machine of claim 1, wherein the air gap is positioned radially relative to the axis of rotation for the rotor.

12. A method of weakening the field in a PM electrical machine, the method comprising:
    providing a connecting flux path in parallel with an air gap between a rotor and a stator of said PM electrical machine, wherein said connecting flux path connects to at least first and second parallel pole flux paths through the rotor and stator, wherein said first parallel pole flux path includes permanent magnetic material and said second parallel pole flux path does not include permanent magnetic material; and positioning at least one field weakening coil relative to said connecting flux path and said parallel pole paths, such that said coil is capable of receiving current from an external source to induce a field control flux in said connecting flux path to adjust a magnitude and a polarity of net flux in the air gap through the parallel pole flux paths.

13. The method of claim 12, wherein the air gap has a first air gap portion and a second air gap portion, and wherein in a first mode of operation, current with a first polarity is supplied to said coil to produce a net air gap flux differential for flux in said first air gap portion and a second air gap portion.

14. The method of claim 13, wherein in a second mode of operation, no current is supplied to said coil to produce a negligible air gap flux in one of said first air gap portion and second air gap portion to reduce the net air gap flux differential.

15. The method of claim 14, wherein in a third mode of operation, current with a second polarity opposite said first polarity is supplied to said coil to produce an air gap flux in said second air gap portion which is equal and in a like direction to an air gap flux in a first air gap portion, to further reduce the net air gap flux differential.

16. The method of claim 12, wherein the air gap is positioned radially relative to the axis of rotation for the rotor; and wherein the stator is without teeth such that an air core is provided.

* * * * *